Aug. 1, 1961 C. L. RUTHROFF 2,994,828

LIMITING IN-PHASE, BUT NOT QUADRATURE, SIDEBAND OF A STRONG CARRIER BY SELECTIVE LOADING ACTION OF A DIODE MODULATOR AT THE TERMINATION OF A BRANCHING NETWORK

Filed July 13, 1959

INVENTOR
C. L. RUTHROFF
BY [signature]
ATTORNEY

United States Patent Office 2,994,828
Patented Aug. 1, 1961

2,994,828

LIMITING IN-PHASE, BUT NOT QUADRATURE, SIDEBAND OF A STRONG CARRIER BY SELECTIVE LOADING ACTION OF A DIODE MODULATOR AT THE TERMINATION OF A BRANCHING NETWORK

Clyde L. Ruthroff, Fair Haven, N.J., assignor to Bell Telephone Laboratories, Incorporated, New York, N.Y., a corporation of New York Filed July 13, 1959, Ser. No. 826,653
7 Claims. (Cl. 328—165)

This invention relates to amplitude modulation limiters and more particularly to a limiter using a single diode to remove the amplitude modulation noise components from a frequency modulated carrier wave.

In systems wherein the transmission of information is via frequency modulation, noise in the system will appear mainly as amplitude modulation. It is therefore desired to provide a device which will limit transmission to only the frequency modulated carrier. In the past, this has been partially accomplished by providing a device which possessed a particular amplitude limit and would therefore "clip" all signals having an amplitude exceeding this limit. Such devices do not, however, eliminate all the amplitude modulation. Amplitude modulation is not restricted to a distinct portion of an alternating wave and may be present at points below as well as above the particular amplitude limit of the device. Also, the received output of a frequency modulation system is as readily distorted by amplitude modulation components below any particular level of "clipping" as by components above that level.

It is therefore the object of this invention to eliminate to a greater extent than heretofore possible the amplitude modulation noise components of a frequency modulation signal.

In accordance with the above object, there is provided an amplitude modulation limiter including a branching device such as a circulator or hybrid junction, one arm of which is terminated to present different impedances to the frequency modulated carrier wave and the amplitude modulated noise sidebands applied to the branching device. The termination includes a single diode and terminating circuits for the diode which have different impedances for noise frequency components and direct current. By matching the impedance of the termination for the amplitude modulated noise sidebands to that of the means provided for coupling the termination to the branching device, absorption of the amplitude modulated noise components occurs while the frequency modulated carrier wave is reflected with a finite loss.

The invention may be more readily understood by reference to the drawing in which.

Figure 1:
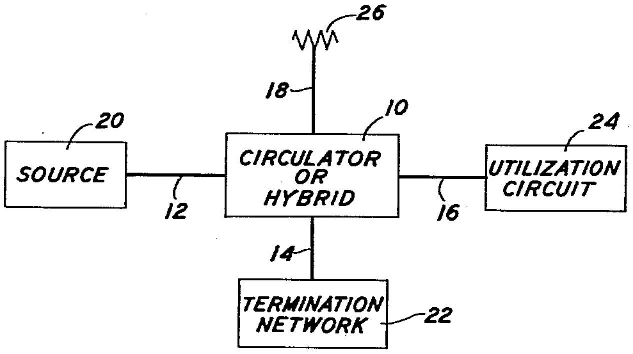
FIG. 1 is a block diagram of the limiter in accordance with the invention.

FIG. 1 discloses a branching network 10 having terminals 12, 14, 16, and 18. Branching network 10 may be either a non reciprocal branching device such as a microwave circulator or a reciprocal device such as a hybrid junction. In an embodiment including a microwave circulator, terminal 18 may be eliminated if desired. Coupled to terminal 12 is a signal source 20. This may be any source or device which transmits a frequency modulated carrier wave accompanied by a noise signal appearing as amplitude modulated sidebands. In a frequency modulation receiver, for example, source 20 would represent the intermediate frequency stage. Coupled to terminal 14 is a termination network 22 including a single diode. This network will be described more completely in connection with FIG. 2. For the present, it will suffice to state that termination network 22 presents different impedances to the frequency modulated carrier wave and to the amplitude modulated noise sidebands. Coupled to terminal 16 is a utilization circuit 24 which receives the output of branching network 10. In the case of a frequency modulation receiver, utilization circuit 24 would usually represent the discriminator of the receiver. Coupled to terminal 18 (if present) is a matching impedance 26.

In the embodiment of the limiter utilizing a microwave circulator such as that described in "Microwave Ferrites and Their Applications," The Microwave Journal, July/August 1958, as branching network 10, signals applied to the circulator from source 20 will appear only at terminal 14. Since termination network 22 does not generate any additional signals, only the energy reflected from termination network 22 will return to the circulator. As will be explained in connection with FIG. 2, the energy of the amplitude modulated noise sidebands is absorbed in termination network 22 while energy of the frequency modulated carrier wave is reflected. Due to the action of the circulator, this reflected energy will appear only at terminal 16 where it will be completely absorbed or transmitted by utilization circuit 24. Any spurious reflections from terminal 16 will be absorbed at terminal 18 which is matched in its characteristic impedance 26.

In an embodiment of the limiter utilizing a hybrid junction, such as a magic T, energy transmitted by source 20 to the branching network 10 will divide, equal amounts appearing at terminals 14 and 18. Due to the matching impedance 26, all energy entering terminal 18 will be absorbed. However, due to the characteristics of termination network 22, only the energy of the amplitude modulated noise sidebands will be absorbed at terminal 14 and the energy of the frequency modulated carrier wave will be reflected by network 22 and will appear at terminals 12 and 16. The energy appearing at terminal 16 will be absorbed or retransmitted by utilization circuit 24.

Figure 2:
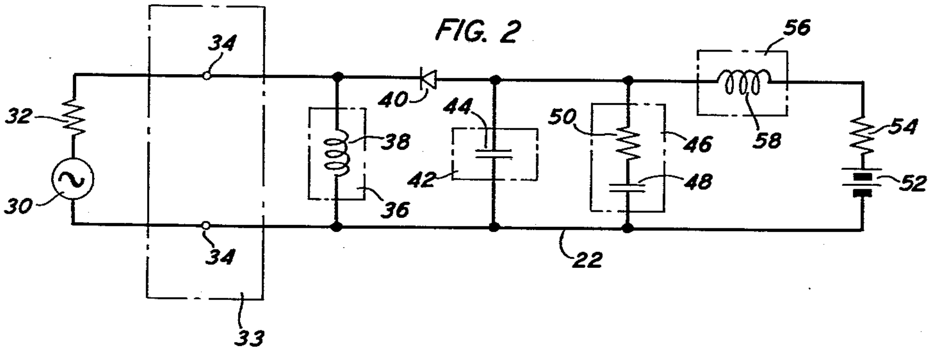
FIG. 2 is a diagram of the termination network shown in block form in FIG. 1.

FIG. 2 discloses in more detail the circuitry of termination network 22. A signal source 30 in series with an impedance 32 representing its internal impedance may be considered as connected to network 22 through a coupling means designated at 33 and having at least terminals 34 corresponding to terminal 14 of FIG. 1. Shunting the terminals 34 is a low pass element 36 which is illustrated as being an inductor 38. Connected in parallel with low pass element 36 is a series network consisting of a diode 40 and a high pass element 42, diode 40 having its cathode connected to one terminal of low pass element 36 and its anode connected to high pass element 42. High pass element 42 is illustrated as being a capacitor 44. Shunting high pass element 42 are two parallel networks. The first consists of a noise frequency pass filter 46 having a specified resistance to noise frequencies. Filter 46 is shown, by way of example, as comprising a capacitor 48 in series with a resistor 50. The second parallel network consists of a D.-C. voltage source 52 for forward biasing diode 40, a resistor 54, and a D.-C. pass element 56 all connected in series. Element 56 may comprise an inductor 58.

In operation, a frequency modulated carrier wave including amplitude modulated noise sidebands is applied to terminals 34. All of the signals will pass through diode 40 in the direction of easy flow. This will produce a voltage at the diode which is the product of the applied signal and the resistance of the diode. As will be explained in detail, the diode voltage will contain an infinite number of frequency components. However, due to the filtering action of each of the paths associated with diode 40, only particular frequencies are allowed to flow, Therefore, the frequency modulated carrier and noise sidebands will only pass from source 30 through high pass element 42 and diode 40; noise frequencies at baseband (difference between amplitude modulated sidebands and carrier) will pass through diode 40 (acting as a baseband voltage source), low pass element 36, and noise filter 46; and the direct current will pass through biasing source 52, resistor 54, D.-C. pass element 56, diode 40, and low pass element 36. Therefore, if the impedance presented to the frequency modulated carrier wave by the diode and the particular circuits associated therewith can be adjusted to a value different than that presented by the diode and the particular termination to the noise components; and the impedance of the termination to noise components is adjusted to match the characteristic impedance of the coupling means 33; complete absorption of the noise components will occur accompanied by reflection of the frequency modulated carrier wave with only a finite loss.

Further analysis of termination network 22 will be limited to low index modulation where the value of a nonlinear resistance such as a diode may be expressed in a Fourier series of resistance terms. With this limitation, termination network 22 may be analyzed by linear network theory. Also, it will not be necessary to consider the presence of the frequency modulated sidebands since, due to their phase relationship with the carrier wave, they are not demodulated in the termination network 22 and only suffer a finite loss similar to that of the carrier wave. Therefore, it is assumed that the applied signal is composed of only a carrier wave plus two amplitude modulated sidebands produced by noise signals.

As previously mentioned, all of the signal components applied to termination network 22 will flow through the diode 40. Therefore, an expression for the voltage developed by the diode is readily obtained by considering the product of the Fourier series resistance expression for the diode and the usual current expression for an amplitude modulated carrier wave. The resulting expanded expression contains an infinite number of frequencies; however, due to the filtering action of the termination circuits connected to diode 40, currents are allowed to flow at only the frequencies corresponding to the carrier, sideband, baseband (difference between sideband and carrier) and direct current; therefore, other frequencies need not be considered since no energy will be contained therein. Also, by applying low index modulation theory, one is able to utilize the principles of superposition and thereby obtain separate loop equations for the voltage developed by each of the allowed signal components.

Applying linear circuit analysis to the resulting loop equations, the following expressions for the impedance of termination network 22 to carrier and noise sideband frequencies are obtained:

$$R_c=\frac{1}{g_0+\frac{g_2}{2}-\frac{R_0 g_1^2}{2(1+g_0R_0)}} \qquad (1)$$

and $$R_s=\frac{1}{g_0+\frac{g_2}{2}-\frac{R_b g_1^2}{2(1+g_0R_b)}} \qquad (2)$$

where, $$g_0=\frac{1-\beta}{B}+\frac{\beta}{A}$$

$$g_1=\frac{2}{\pi}\left[\frac{1}{A}-\frac{1}{B}\right]\sin\beta\pi \qquad (3)$$

$$\frac{g_2}{2}=\frac{1}{2\pi}\left[\frac{1}{A}-\frac{1}{B}\right]\sin 2\beta\pi$$

$R_c$ is the impedance presented to the carrier component of the applied signal; $R_s$ is the impedance presented to the noise sideband components; $g_0$, $g_1$, and $g_2$ are Fourier coefficients of the resistance expression for diode 40; $R_0$ is the value of resistor 54; $R_b$ is the value of resistor 50; A is the forward resistance of diode 40; B is the reverse resistance of diode 40; and $\beta$ is the fraction of the carrier cycle that diode 40 is back biased. As may be seen from Equations 1 and 2, the impedance of termination network 22 to noise sideband frequencies will differ from the impedance to carrier frequency components if the value of resistor 54 is different from the value of resistor 50. Therefore, by attaching termination network 22 to a coupling means associated with branching network 10 and matching the impedance of termination network 22 for noise sidebands to the characteristic impedance of the coupling means, a complete absorption of the noise components will occur and perfect limiting will result.

In its usual application, this invention would follow a stage in a frequency modulation receiver having a substantially constant output level, and therefore, only one limiter would be necessary. If, however, more than one output level were possible, several limiters could be cascaded to provide limiting over any range of output levels desired.

What is claimed is:

1. In a transmission system transmitting a frequency modulated carrier wave accompanied by noise appearing as amplitude modulated sidebands, an amplitude modulation limiter comprising a branching network having at least three ports, the first port receiving signals applied to said limiter, a termination network coupled to the second port for presenting different impedances to carrier and amplitude modulated noise components of an applied signal, said termination network including a nonlinear impedance and terminating circuits therefor having different impedances for noise components and direct current, means for matching the impedance of said termination network for amplitude modulated noise sidebands to the characteristic impedance of said second port, and means coupled to the third port for utilizing energy reflected from the second port.

2. An amplitude modulation limiter comprising a first network including an input having two terminals, a low pass element shunting said input, a nonlinear impedance having first and second terminals, said first terminal being connected to one terminal of said input, three parallel branches connected between said second terminal and the other terminal of said input, the first branch comprising a high pass element, the second branch comprising a noise frequency pass filter having a fixed resistance to noise frequencies, the third branch comprising in series a D.-C. pass element, means for biasing said nonlinear impedance, and a resistance having a magnitude which differs from the resistance of said noise filter; a second network including input and output terminals, and means for coupling signals containing amplitude modulated noise sidebands from said input terminal to the input of said first network and transmitting reflected signals from said first network to said output terminal; and means for matching the characteristic impedance of said coupling means to the impedance of said first network for noise sidebands.

3. In a transmission system transmitting a frequency modulated carrier wave accompanied by noise appearing as amplitude modulated sidebands, an amplitude modulation limiter comprising a branching network having at least three ports, the first port receiving signals applied to said limiter, a termination network coupled to the second port for presenting different impedances to frequency modulated carrier and amplitude modulated noise sideband components of an applied signal, said termination network including a low pass element shunting said second port, a first series network in parallel with said low pass element and including a diode in series with a high pass element, a noise frequency pass filter shunting said high pass element and having a specified resistance to noise frequencies, a second series network in parallel with said noise filter and including in series a D.-C. pass filter, means for forward biasing said diode, and a resistance having a magnitude which differs from the specified resistance of said noise filter, means for matching the impedance of said termination network for amplitude modulated noise sidebands to the characteristic impedance of the second port, and means coupled to the third port for utilizing the energy reflected from said second port.

4. An amplitude modulation limiter as defined in claim 3 wherein said branching network is a microwave circulator.

5. An amplitude modulation limiter as defined in claim 3 wherein said branching network is a hybrid junction having two pairs of conjugate ports, the first and third ports corresponding to the first pair of conjugate ports, the second port corresponding to one port of the second pair of conjugate ports, and further including means for terminating the remaining port of the second pair in its characteristic impedance.

6. In combination with a source of frequency modulated carrier waves accompanied by a noise signal appearing as amplitude modulated sidebands, an amplitude modulation limiter comprising a microwave circulator having at least three ports, the first port receiving signals applied to said limiter, a termination network coupled to the second port for presenting different impedances to frequency modulated carrier and amplitude modulated noise sideband components of an applied signal, said termination network including an inductor shunting said second port, a first series network in parallel with said inductor and including a diode in series with a capacitor, a noise frequency pass filter shunting said inductor and including a resistor in series with a capacitor, a second series network in parallel with said noise filter and including in series a high inductance coil, a D.-C. voltage source for forward biasing said diode, and a resistor having a magnitude different from said resistor associated with said noise filter, means for matching the impedance presented by said termination network to amplitude modulated noise sidebands to said characteristic impedance of the second port, and means coupled to the third port for utilizing the energy reflected from the second port.

7. In combination with a source of frequency modulated carrier waves accompanied by a noise signal appearing as amplitude modulated sidebands, an amplitude modulation limiter comprising a hybrid junction having two pairs of conjugate ports, the first pair of conjugate ports comprising input and output means, means for terminating a first port of the second pair of conjugate ports in its characteristic impedance, a termination network coupled to a second port of the second pair of conjugate ports for presenting different impedances to frequency modulated carrier and amplitude modulated noise sideband components of an applied signal, said termination network including an inductor shunting said second port, a first series network in parallel with said inductor and including a diode in series with a capacitor, a noise frequency pass filter shunting said inductor and including a resistor in series with a capacitor, a second series network in parallel with said noise filter and including in series a high inductance coil, a D.-C. voltage source for forward biasing said diode, and a resistor having a magnitude different from said resistor associated with said noise filter, and means for matching the impedance presented by said termination network to amplitude modulated noise sidebands to the characteristic impedance of the second port.

References Cited in the file of this patent

UNITED STATES PATENTS

| | | |
|---|---|---|
| 2,606,971 | Scott | Aug. 12, 1952 |
| 2,732,528 | Anderson | Jan. 24, 1956 |
| 2,771,586 | Di Toro | Nov. 20, 1956 |
| 2,839,675 | Neumann | June 17, 1958 |